United States Patent [19]

Nonoyama et al.

[11] Patent Number: 4,760,463
[45] Date of Patent: Jul. 26, 1988

[54] IMAGE SCANNER APPARATUS WITH SCANNING FUNCTION

[75] Inventors: Makoto Nonoyama, Yokohama; Tadashi Tsukahara, Tokyo; Junichi Tsubota, Yokohama, all of Japan

[73] Assignee: Kabushiki Kaisha Toshiba, Kawasaki, Japan

[21] Appl. No.: 938,645

[22] Filed: Dec. 5, 1986

[30] Foreign Application Priority Data

Dec. 7, 1985 [JP] Japan .................................. 60-275478
Dec. 27, 1985 [JP] Japan .................................. 60-293157
Dec. 27, 1985 [JP] Japan .................................. 60-294076
Feb. 13, 1986 [JP] Japan .................................... 61-29317

[51] Int. Cl.$^4$ ............................................ H04N 1/387
[52] U.S. Cl. ..................................... 358/280; 358/282
[58] Field of Search ...................... 358/75, 76, 80, 280, 358/282; 340/365 R

[56] References Cited

U.S. PATENT DOCUMENTS

| 4,458,238 | 7/1984 | Learn | 340/365 R |
| 4,475,239 | 10/1984 | van Raamsdonk | 340/365 R |
| 4,485,408 | 11/1984 | Kamiz Yo | 358/280 |
| 4,538,183 | 8/1985 | Kanno | 358/280 |
| 4,656,525 | 4/1987 | Norris | 358/80 |
| 4,663,662 | 5/1987 | Sekizawa | 358/80 |
| 4,686,579 | 8/1987 | Sakamoto | 358/282 |
| 4,692,796 | 9/1987 | Yamada | 358/76 |
| 4,692,797 | 9/1987 | Matsumoto | 358/76 |

FOREIGN PATENT DOCUMENTS

3420553A1 6/1984 Fed. Rep. of Germany .
3420482A1 12/1984 Fed. Rep. of Germany .
58-14270 1/1983 Japan .

Primary Examiner—Howard W. Britton
Attorney, Agent, or Firm—Cushman, Darby & Cushman

[57] ABSTRACT

An image scanning section has an optical system for scanning an original in a two-dimensional manner, and a photoelectric converter for converting an optical image obtained by the optical system into an electrical signal. A binary coding section performs simple binary coding of the electrical signal supplied from the photoelectric converter in such a manner as not to accompany pseudo-gray scale coding, and performs pseudo-gray scale binary coding of the electrical signal supplied from the photoelectric converter in such a manner as to accompany pseudo-gray scale coding. An area designating section designates an area on the original. A scanning mode designating section designates image scanning modes within and outside an area designated by the area designating section and has at least a first scanning mode designating section which does not accompany pseudo-gray scale coding and a second scanning mode designating section which accompanies pseudo-gray scale coding. A controller controls an output or outputs from the binary coding section in accordance with designation by the area and mode designating sections.

14 Claims, 12 Drawing Sheets (DISPLAY)  ☐ BLINK DISPLAY  (KEY OPERATION)

FIG. 8A

PHOTO AREA : Xa = 25 , Ya=☐
1        Xb =     , Yb=

PHOTO AREA : Xa = 25 , Ya=20
1        Xb =☐   , Yb=

PHOTO AREA : Xa = 25 , Ya=20
1        Xb = 80 , Yb=☐

PHOTO AREA : Xa = 25 , Ya=20
☐       Xb = 80 , Yb=115

[1] [1] [5] [*]
[#]

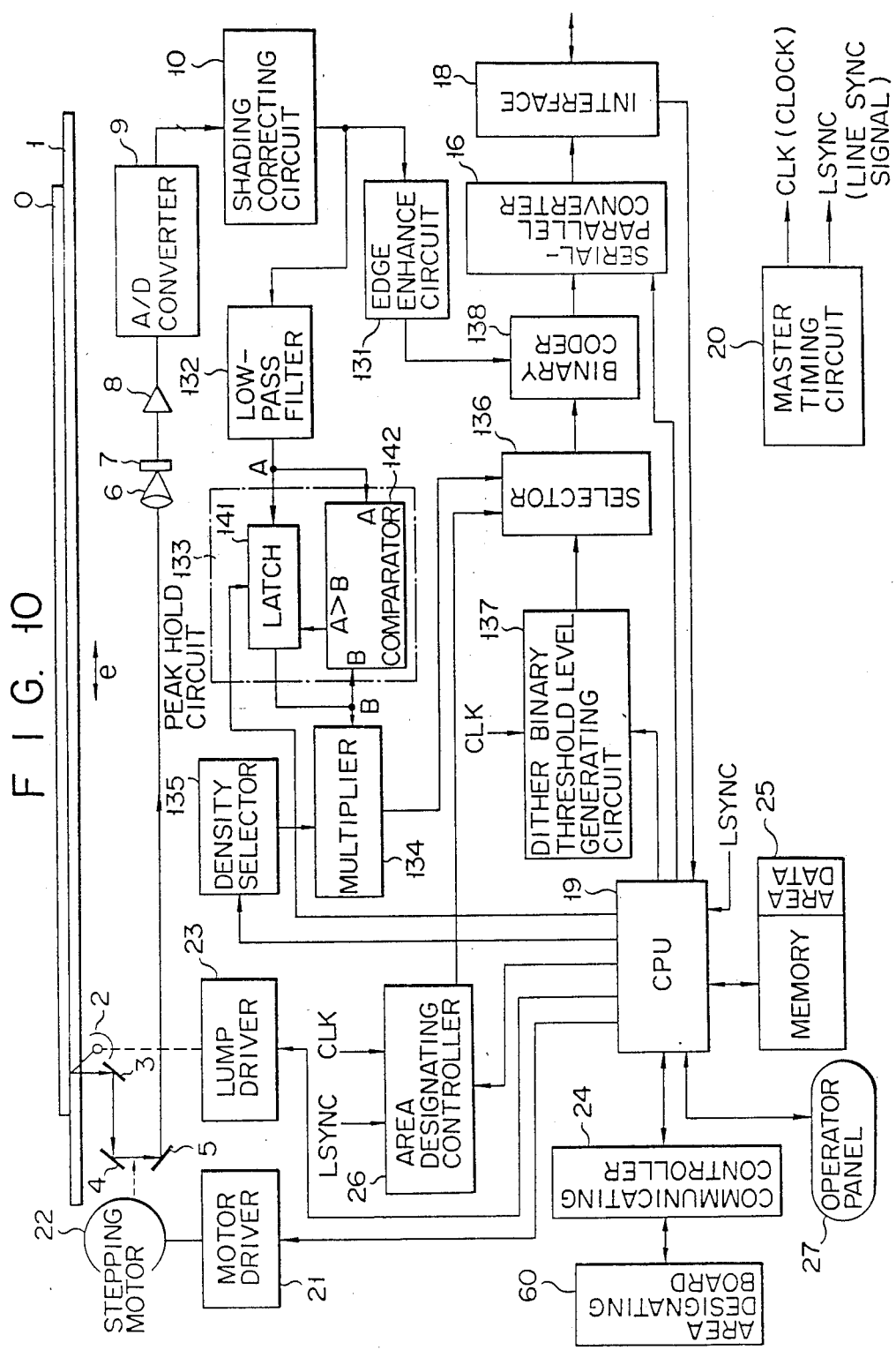

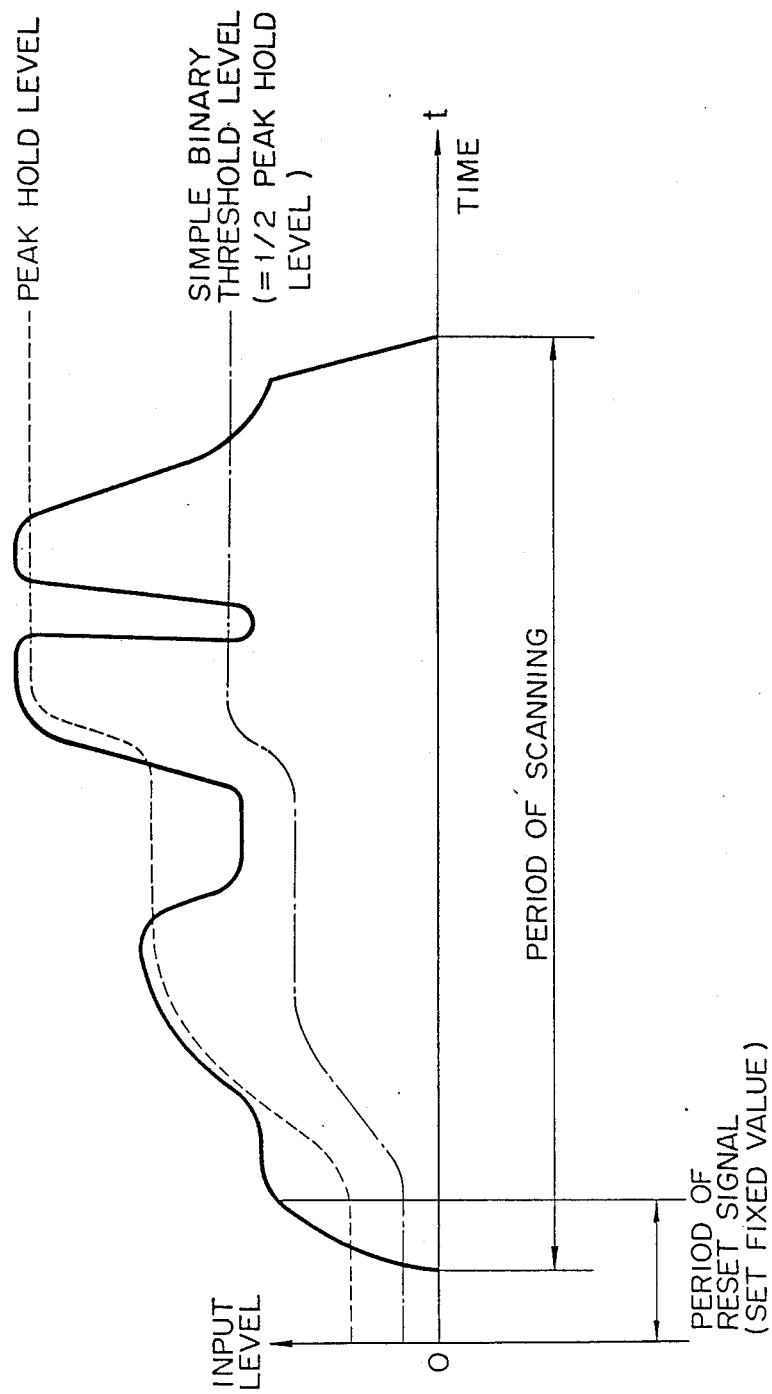

IMAGE SCANNER APPARATUS WITH SCANNING FUNCTION

BACKGROUND OF THE INVENTION

This invention relates to an image scanner apparatus with scanning function and, more particularly, to an apparatus for scanning an image of an original, which is filed by an image data file unit, in a two-dimensional manner.

When an original image is to be scanned, a conventional image scanner apparatus of an image data file unit performs binary coding by means of a simple binary or dither binary means. A character portion on the original is scanned by simple binary coding means and a non-alphanumeric character portion, such as a photo, is scanned by dither binary coding means or the like.

However, it is not convenient to divide an original having character and photo portions into separate portions to effect scanning of the original by merely using separate binary coding means. Therefore, when character and photo portions are mixed in a single original, often, only the character or photo portion can be correctly scanned.

A scanner wherein an original is divided into character and photo portions and binary coding is performed using separate binary coding means has the following problem.

A scanner of this type changes the level of an image signal in accordance with the density of the background of image data corresponding to the original. More specifically, an image signal is divided by a level obtained by subjecting the image signal to peak hold, thereby performing gain control and simple binary coding at a predetermined slice level. When such an image signal is to be subjected to binary coding using a dither method or the like, however, since the level of the image signal changes in accordance with the density of the background, correct gradation cannot be obtained. In other words, a photo portion cannot be subjected to optimum binary coding.

In addition, since character and photo portions are scanned based on the same thickness standards, they cannot be scanned in an optimum manner.

Furthermore, in the original scanner apparatus as described above, when area designation is to be performed to divided a single original into character and photo portions, an area designation key must be provided on an operation panel. This renders the operation panel complex, and an input operation of area designation data becomes cumbersome. If area designation data is input during original scanning, processing of the apparatus becomes complex. Also, area designation data cannot be stored.

SUMMARY OF THE INVENTION

It is, therefore, an object of the present invention to provide a new and improved image scanner apparatus with scanning function which can scan character and photo portions of a mixed character-photo original.

According to the present invention, there is provided an image scanner apparatus with scanning function, the apparatus comprising image scanning means having optical means for scanning an original in a two-dimensional manner, and photoelectric converting means for converting an optical image obtained by the optical means into an electrical signal, binary coding means for performing simple binary coding of the electrical signal supplied from the photoelectric converting means, the simple binary coding not accompanying pseudo-gray scale coding, and for performing pseudo-gray scale binary coding of the electrical signal supplied from the photoelectric signal converting means, the pseudo-gray scale binary coding accompanying pseudo-gray scale coding, area designating means for designating an area on the original, scanning mode designating means, which designates image scanning modes corresponding to areas within the outside an area designated by the area designating means, and which has at least a first scanning mode designating section which does not accompany pseudo-gray scale coding and a second scanning mode designating section which accompanies pseudo-gray scale coding, and controlling means for controlling an output or outputs from the binary coding means in accordance with designation by the area and mode designating means.

BRIEF DESCRIPTION OF THE DRAWINGS

These and other objects and features of the present invention can be understood through the following embodiments by reference to the accompanying drawings, in which:

FIGS. 1 to 9 show first and second embodiments of the present invention, in which FIG. 1 is a view schematically showing an overall configuration thereof, FIG. 3 is a view showing a configuration of an area-designating controller, FIG. 4 is a plan view showing an arrangement of an area-designating board, FIG. 5 is a block diagram showing a circuit configuration of the area designating board, FIG. 7 shows an area-designated portion, FIGS. 8A to 8D show examples of a liquid-crystal display and a key operation for explaining area designation in FIG. 7, and FIG. 9 shows an example of area designation; and FIGS. 10 and 11 show a third embodiment of the present invention, in which FIG. 10 schematically shows an entire configuration thereof, and FIG. 11 is a view for explaining a relationship between a peak hold value and a simple binary threshold level.

DETAILED DESCRIPTION OF THE PREFERRED EMBODIMENTS

Several embodiments of the present invention will be described with reference to the accompanying drawings.

Figure 1:
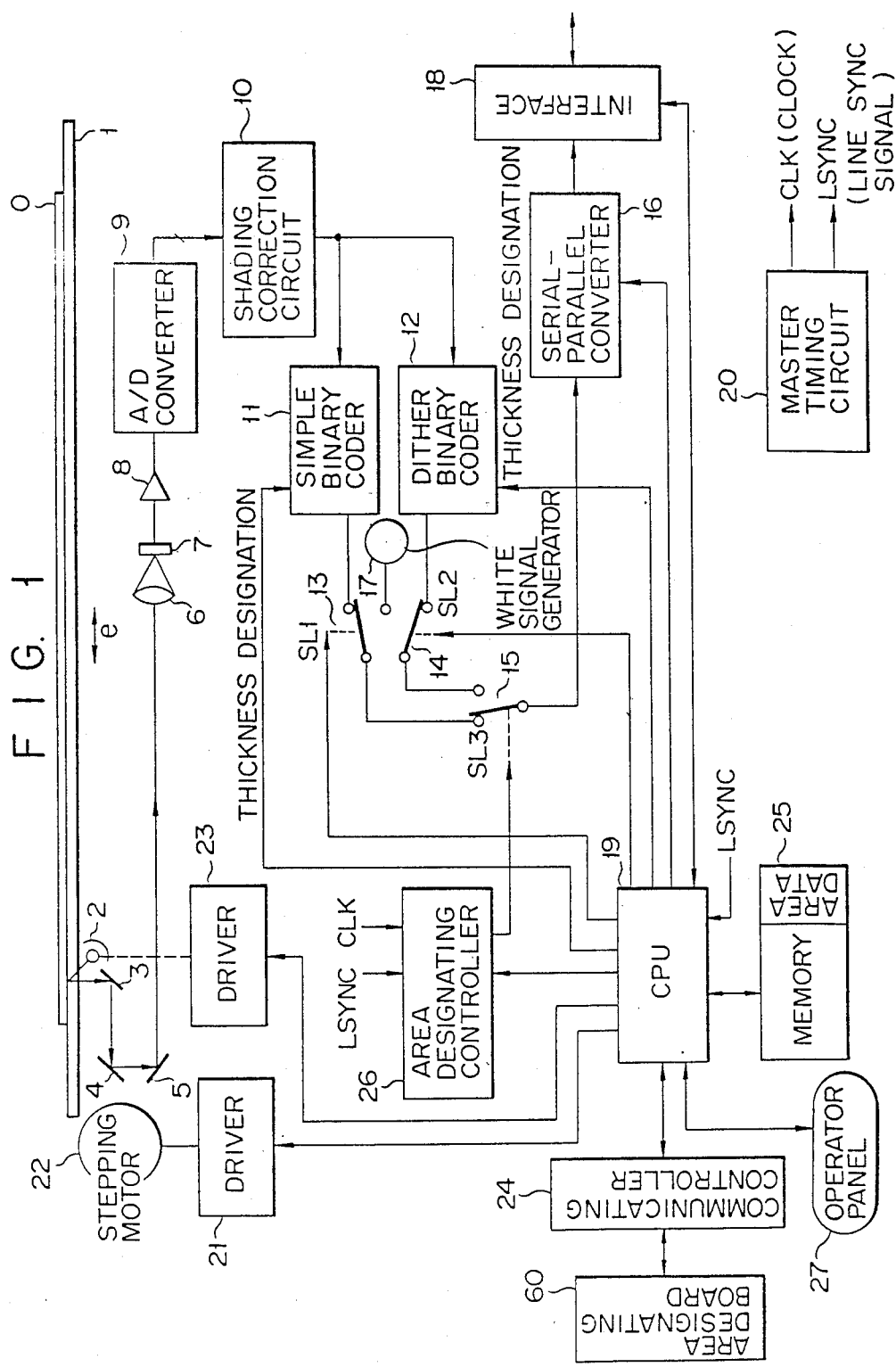

FIG. 1 schematically shows an image scanner apparatus according to a first embodiment of the present invention. Referring to FIG. 1, original table (transparent glass) 1 for receiving original O is fixed on a housing (not shown). Original O placed on original table 1 is exposed and scanned when an optical system consisting of exposure lamp 2 and mirrors 3, 4, and 5 reciprocates in the directions indicated by double-headed arrow e along the lower surface of table 1. In this case, mirrors 4 and 5 are moved at a speed ½ that of mirror 3, in order to maintain an optical path length. Reflected light obtained by scanning original O by the optical system, i.e., reflected light obtained by irradiating original O by lamp 2, is reflected by mirrors 3, 4, and 5, transmitted through lens 6, and guided to line image sensor (CCD) 7. An image of original O is formed on sensor 7.

Line image sensor 7 converts the formed image into a corresponding electrical signal and outputs it to A/D converter 9 through amplifier 8. A/D converter 9 converts the signal supplied from sensor 7 through amplifier 8 into a digital signal, such as multi-level data, and outputs it to shading correction circuit 10. Correction circuit 10 performs shading correction of the supplied digital signal, and outputs it to simple binary coder 11 and pseudo- (dither) binary coder 12. Simple binary coder 11 compares an output signal supplied from correcting circuit 10 with a predetermined slice level. When the output signal level is higher than the slice level, it is discriminated as "white" and a "0" signal is output. When the output signal level is lower than the slice level, it is discriminated as "black" and a "1" signal is output.

Dither binary coder 12 binarily digitizes an output signal supplied from correcting circuit 10 using a predetermined dither pattern and outputs a "0" or "1" signal. An output from binary coder 11 is supplied to serial-parallel converter 16 via switches 13 and 15. An output from dither binary coder 12 is supplied to converter 16 via switches 14 and 15. Switches 13 and 14 are connected to white signal generator 17, which constantly generates a "0" signal. A parallel signal from converter 16 is output to a control section (not shown) of an image data file unit (not shown) via interface 18.

CPU 19, as a control unit, controls the entire system of the scanner apparatus in accordance with a line sync signal (LSYNC) from master timing circuit 20. In other words, CPU 19 drives stepping motor 22 which moves the optical system, and control driver 23, in order to drive exposure lamp 2. CPU 19 also stores area data, which is supplied from area-designating board 60 for designating a scanning area in original O through communication controller 24, in an area storage area in memory 25, and outputs the area data to area-designating controller 26.

Controller 26 controls switch 15 in accordance with a line sync signal (LSYNC) and a clock (CLK) supplied from timing circuit 20 and area data supplied from CPU 19, and will be described later in detail. CPU 19 controls switches 13 and 14 in accordance with a mode designated by operator panel 27, and outputs a thickness-designation signal to coders 11 and 12, in accordance with the thickness set by panel 27, and a density signal to converter 16.

Area-designating board 60 designates a scanning area and will be described later in detail. Area designation has four modes, i.e., photo, character, masking, and trimming area modes. Area designation is performed using ten keys, and a maximum of three areas can be set for 1 format (a single original). The set content of a maximum of 10 formats of different designated areas can be stored.

Figure 2A:
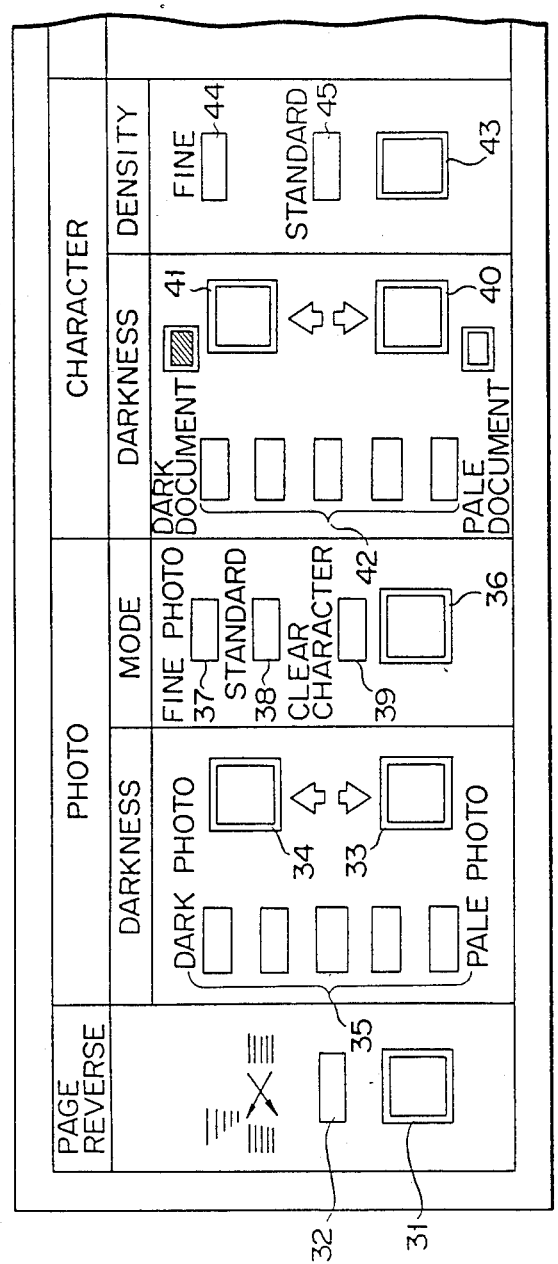
FIGS. 2A and 2B are views showing an arrangement of an operation panel.
Figure 2B:
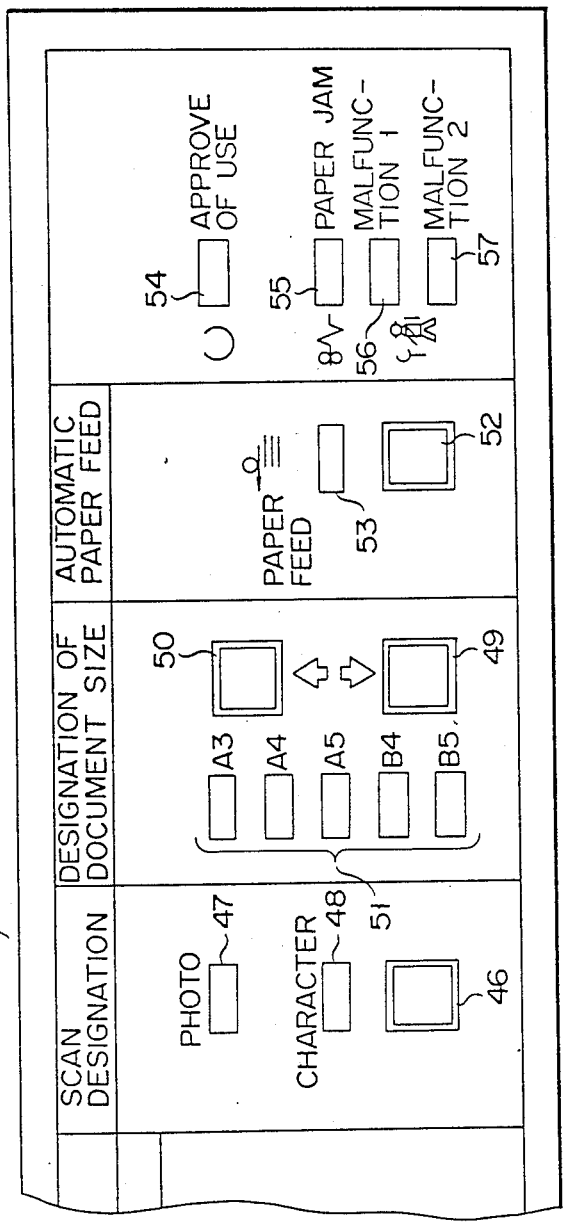

Operator panel 27 is arranged as shown in FIGS. 2A and 2B. More specifically, panel 27 has page reverse key 31, indicator 32, photo darkness setting keys 33 and 34, indicator 35, mode switching key 36, indicators 37, 38, and 39, character darkness setting keys 40 and 41, indicator 42, density switching key 43, indicators 44 and 45, scan designation key 46, indicators 47 and 48, document size designating keys 49 and 50, indicator 51, automatic paper feed key 52, and indicators 53, 54, 55, 56, and 57. Page reverse key 31 designates other side page. Indicator 32 is turned on when a page reverse mode is set by key 31. Photo darkness setting keys 33 and 34 set scanning darkness for scanning a photo area. Indicator 35 includes five indicator sections which are turned on to indicate corresponding darkness (five levels) set by keys 33 and 34. Mode switching key 36 designates fine photo, standard, or clear character mode as a scanning mode. Indicators 37, 38, and 39 indicate fine photo, standard, and clear character modes when they are designated by key 36, respectively. Character darkness setting keys 40 and 41 set a scanning darkness for scanning a character area. Indicator 42 includes five indicator sections which are turned on to indicate corresponding set darkness (5 levels) set by keys 40 and 41. Density switching key 43 designates a density (resolution) in character scanning, i.e., a fine density, or a standard density. Indicators 44 and 45 are turned on to indicate the fine and standard densities, respectively, set by key 43. Scanning designating key 46 designates character scanning or a mixed photocharacter scanning. Indicators 47 and 48 are turned on to indicate photo and character modes, respectively, designated by key 46. Document size designating keys 49 and 50 designate a document size. Indicator 51 indicates a document size designated by keys 49 and 50. Automatic paper feed key 52 selects automatic paper feed. Indicator 4 is turned on when automatic paper feed is set by key 52. Indicator 54 indicates whether the apparatus can be used or not. Indicator 55 is turned on when a paper jamming occurs. Indicators 56 and 57 indicate malfunctions 1 and 2, respectively. Each indicator comprises an LED.

The fine photo, standard, and character clear modes as scanning modes designated by key 36 have different number of dither gray levels. The fine photo mode has 64 gray levels, the standard mode has 32 gray levels, and the character clear mode has 18 gray levels. The fine and standard densities set by key 43 are 16 lines/mm and 8 lines/mm, respectively.

Figure 3:
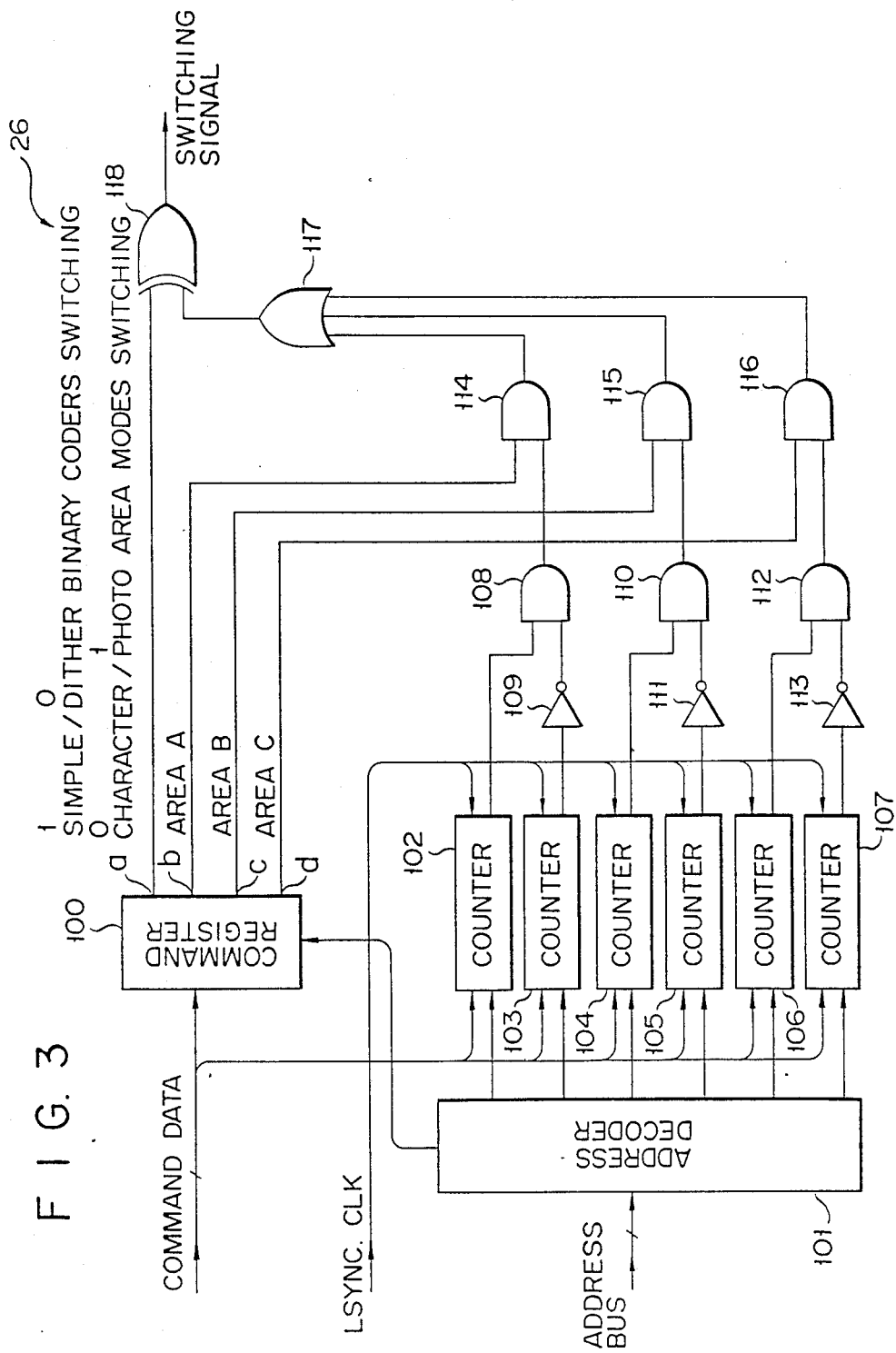

FIG. 3 is a view for explaining a configuration of area designating controller 26. Command data from CPU 19 is supplied to command register 100 and counters 102, 103, 104, 105, 106, and 107. Address data from CPU 19 is supplied to register 100 and counters 102 to 107 via address decoder 101. Counters 102 to 107 also receive a line syn signal (LSYNC) and a clock (CLK) from master timing circuit 20. Command register 100 selects and latches command data matching the address data supplied from decoder 101, and outputs it.

A "1" or "0" signal is output from output terminal a of register 100 in accordance with whether the data is simple or dither binary coded data, or whether a photo or character area mode is set. A "1" or "0" signal is output from output terminal b of register 100 in accordance with whether the data corresponds to area A. A "1" or "0" signal is output from output terminal c of register 100 in accordance with whether the data corresponds to area B. A "1" or "0" signal is output from output terminal d of register 100 in accordance with whether the data corresponds to area C. As a result, data is output in units of bits from output terminal a, a "1" signal is output from output terminal b for a period corresponding to a vertical (sub) scanning of area A, a "1" signal is output from output terminal c for a period corresponding to a vertical (sub) scanning of area B, and "1" signal is output from output terminal d for a period corresponding to a vertical (sub) scanning of area C.

Counters 102 to 107 set command data corresponding to the address supplied from address decoder 101, i.e., a set value, and outputs a "0" signal until a coincidence is established between the content set therein and their count values, and a "1" signal when a coincidence is established therebetween. Counters 102 to 107 start counting in response to every clock signal (CLK) and are cleared in response to every line sync signal (LSYNC). The output from counter 102, 104, or 106 is supplied to one input terminal of AND circuit 108, 110, or 112, respectively. The other input terminal of AND circuit 108, 110, or 112 receives an output from counter 103, 105, or 107.

The output from AND circuit 108, 110, or 112 is supplied to one input terminal of AND circuit, 114, 115, or 116. The other input terminal of AND circuit 114, 115, or 116 receives an output from output terminal b, c, or d of register 100, respectively. The outputs from AND circuits 114, 115, and 116 are supplied to one input terminal of Exclusive OR (EOR) circuit 118 via OR circuit 117. The other input terminal of EOR circuit 118 receives the output from output terminal a of register 100. An output from EOR circuit 118 is supplied to switch circuit 15 as a switching signal.

Figure 4:
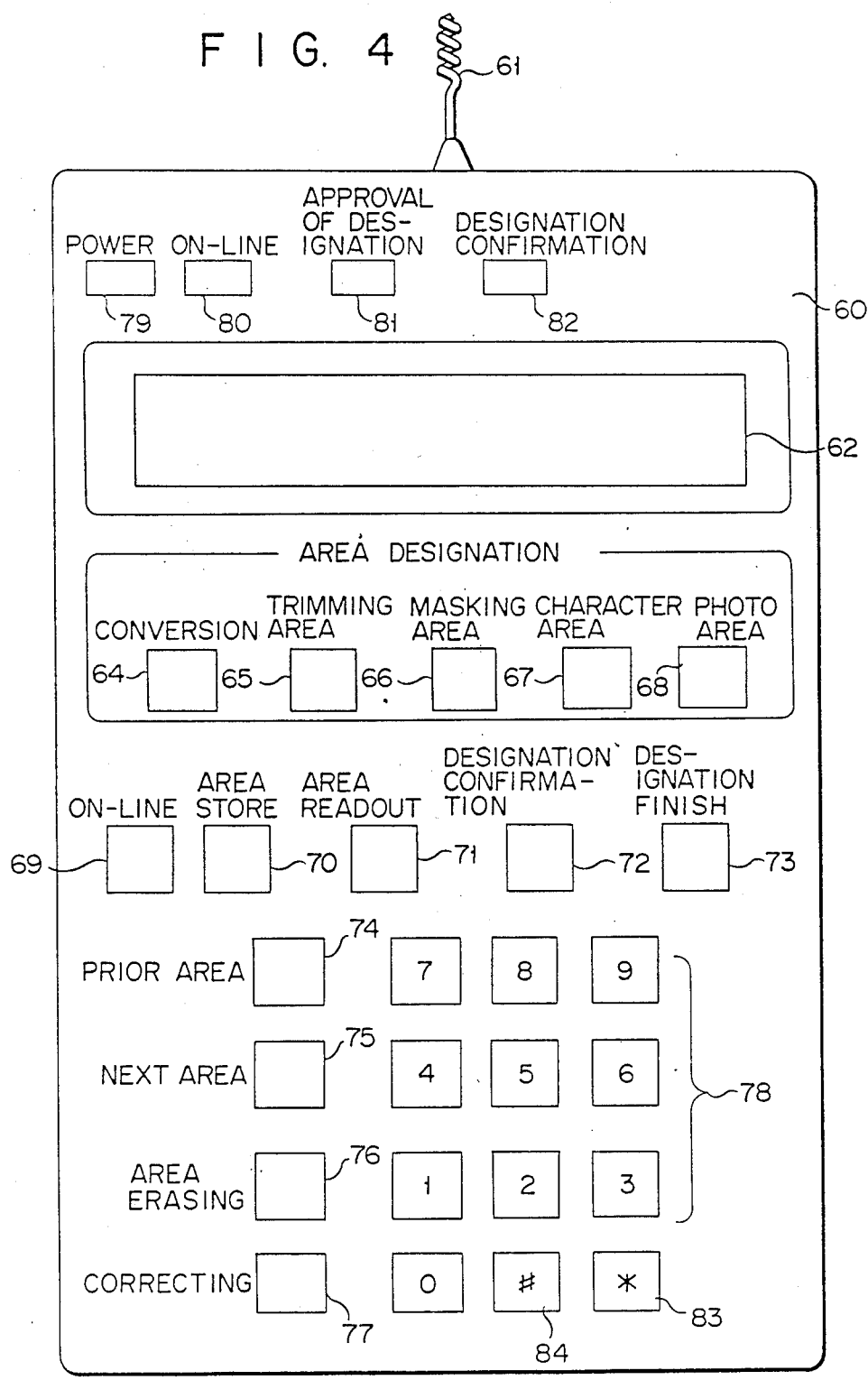

FIG. 4 shows an operation section of area designating board 60. More specifically, board 60 is connected to communication controller 24 via cable 61. Board 60 has, on its upper surface, liquid crystal display 62, mode switching key 64, trimming area designating key 65, masking area designating key 67, photo area designating key 68, on-line key 69, area storage key 70, area readout key 71, designation confirmation key 72, designation finish key 73, area designating keys 74 and 75, area erasing key 76, correcting key 77, ten keys 78, * key 83, # key 84, and indicators 79, 80, 81, and 82. Liquid crystal display 62 displays respective modes and corresponding coordinates. Key 64 is depressed when a mode is to be changed. Key 65 is depressed when the trimming area mode is to be designated. Key 66 is depressed when the masking area mode is to be designated. Key 67 is depressed when the character area mode is to be designated. Key 68 is depressed when photo area mode is to be designated. Key 69 is depressed for switching between on- and off-lines. Key 70 is depressed when a content (coordinate data of a maximum of three areas) of a set format (a maximum of 10 formats) is to be stored. Key 71 is depressed when a stored format is to be read out. Key 72 is depressed when one format area is to be confirmed by the image file unit (not shown). Key 73 is depressed when the area designation of one format is finished. Key 74 is depressed to request display of coordinate data of a previous area. Key 75 is depressed to request display of coordinate data of a next area. Key 76 is depressed to clear 1-area coordinate data displayed on display 62. Key 77 is depressed when coordinate data is to be partially corrected. Keys 78 are depressed when coordinate data is to be input. * Key 83 is depressed after coordinate data or a memory address is input using ten keys 78. # key 84 is depressed after 1-area coordinate data is input or to request display of area data. Indicator 79 is turned on when the power source is turned on. Indicator 80 is turned on when the on-line mode is set. Indicator 81 is turned when when designation is possible. Indicator 82 is turned on when designation confirmation is performed.

When key 72 is depressed and area data is transmitted, negative scanning is performed only for a portion outside the area designated by the area data, and it is signalled to the operator to confirm whether the set area is correct. It is also possible to designate execution or cancel of scanning with area designation by depressing key 69.

Each of indicators 79 to 82 comprises an LED.

Figure 5:
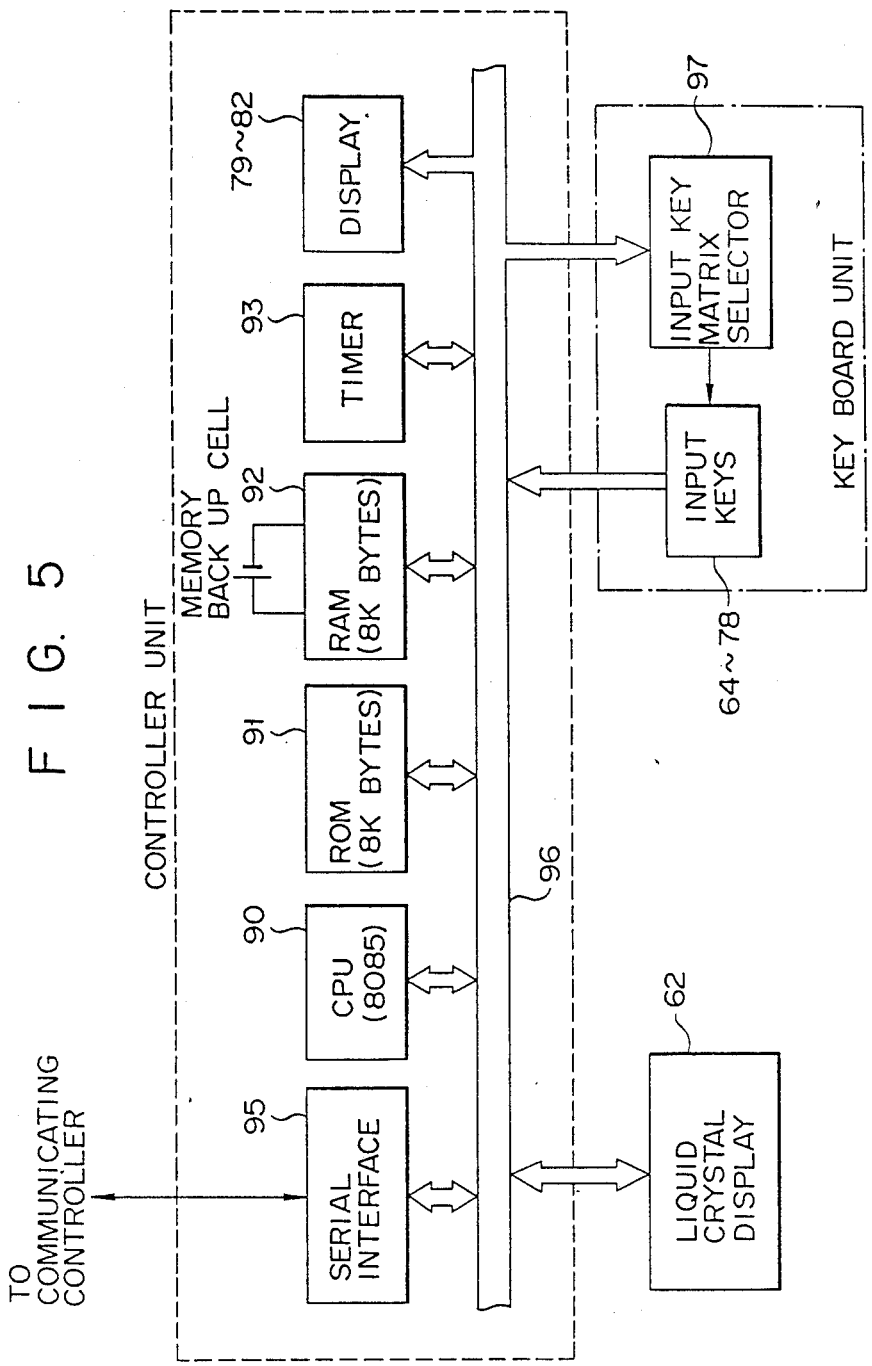

The electric circuit configuration of board 60 is as shown in FIG. 5. More specifically, area designating board 60 has CPU (8085) 90 for controlling the entire operation of board 90, ROM 91 storing a control program, data storage RAM 92, program timer 93, LED indicators 79 to 82, serial interface 95 for exchanging data with controller 24 via cable 61, input key matrix selector 97, input keys 64 to 78, liquid crystal display 62, and data bus 96 for connecting the above components. RAM 92 is connected to a memory backup cell. CPU 90, ROM 91, RAM 92, program timer 93, indicators 79 to 82, and interface 95 are formed on a control circuit board unit. Selector 97 and respective keys 64 to 78 are formed on a keyboard unit.

Figure 6A:
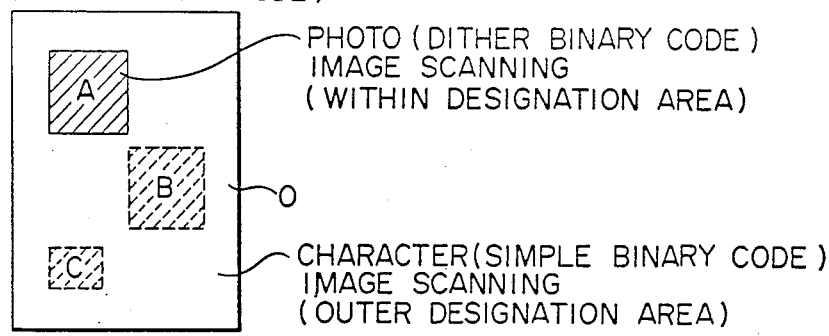
FIGS. 6A to 6D are views showing examples of an output image in respective modes.
Figure 6B:
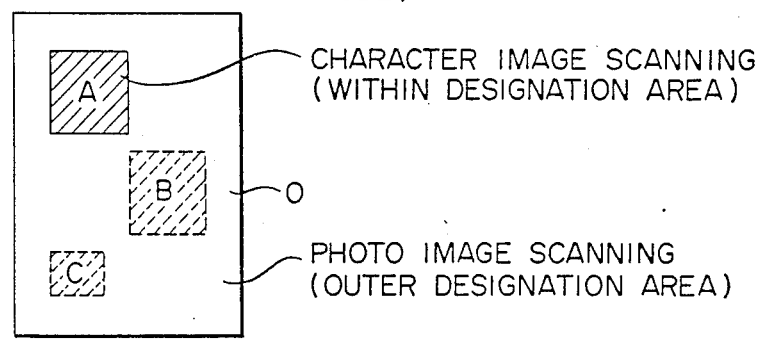
Figure 6C:
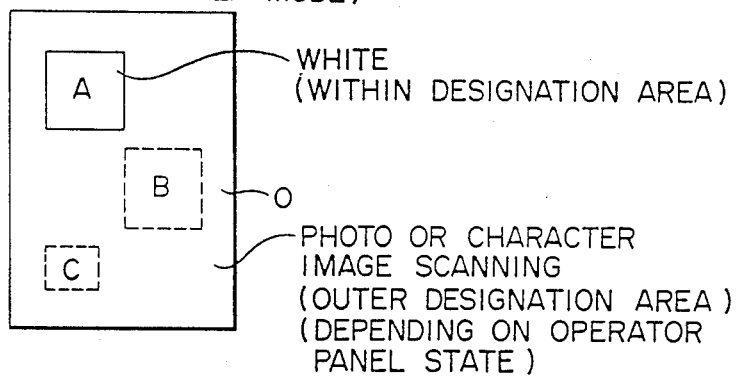
Figure 6D:
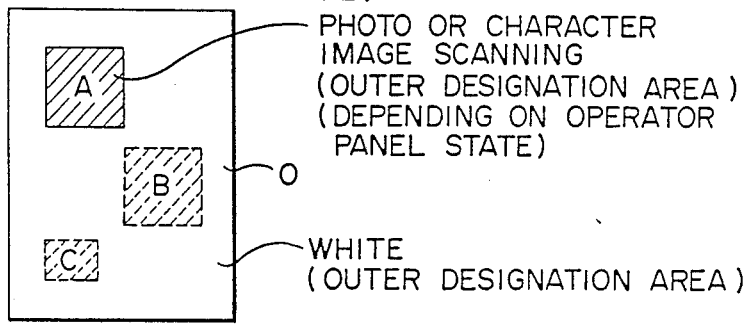

In the photo area mode, scanning of an image within a designation area (area A, B, or C) is performed by dither binary code image scanning, i.e., photo image scanning, and scanning of an image outside the designation area is performed by simple binary code image scanning, i.e., character image scanning, as shown in FIG. 6A. In the character area mode, scanning of an image within a designation area (area A, B, or C) is simple binary code image scanning, i.e., character image scanning, and scanning of an image outside the designation area is dither binary code image scanning, i.e., photo image scanning, as shown in FIG. 6B. In the masking area mode, scanning of an image within a designation area (area A, B, or C) is white scanning, and scanning of an image outside the designation area is simple binary code character image scanning, or dither binary code photo image scanning (depending on the designation mode of panel 27), as shown in FIG. 6C. In the trimming area mode, scanning of an image within a designation area (area A, B, or C) is simple binary code character image scanning or photo image scanning (depending on the designation mode of panel 27), and scanning of an image outside the designation area is white scanning, as shown in FIG. 6D.

Figure 7:
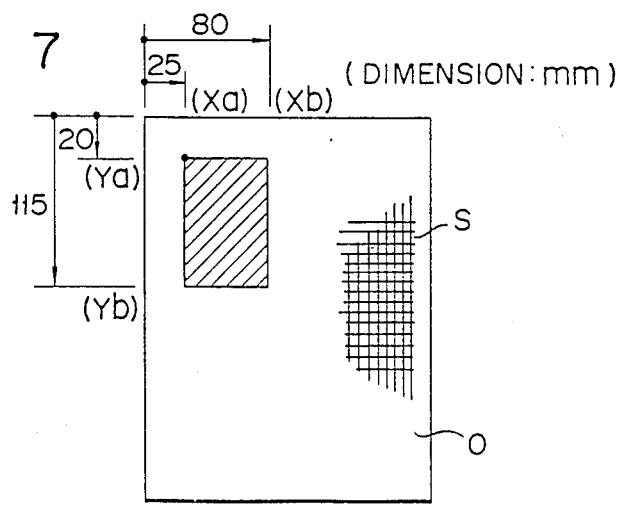

Designation operation by area designating board 60 will be described with reference to FIGS. 7 and 8A to 8D. More specifically, original O is placed in transparent bag-like area scale S having a scale thereon. The size of the area to be designated is obtained by using area scale S, and coordinate data of upper left and lower right points (Xa, Ya) and (Xb, Yb), respectively, of the designation area are input. For example, in the photo area mode, "25" is entered using ten keys 78 and * key 83 is depressed (display shown in FIG. 8A is made in this case). "20" is entered using keys 78 and key 83 is depressed (display shown in FIG. 8B is made in this case). "80" is entered using keys 78 and key 83 is depressed (display shown in FIG. 8C is made in this case). "115" is entered using keys 78 and * or # key 83 or 84 is depressed (display shown in FIG. 8D is made in this case). As a result, an area indicated by hatched lines in FIG. 7 is designated.

The operation with the above arrangement will be described. A case wherein an area is designated and stored will first be described with reference to FIG. 9. The operator places original O in area scale S, in the manner as described above, and reads the size of the area to be designated using scale S. If the operator wishes to designate a photo area, he depresses area mode designating key 68. Then, CPU 90 determines the photo area mode and displays "PHOTO AREA, M0/#1, Xa=, Ya=, Xb=, Yb=" on liquid crystal display 62. In accordance with this display, the operator enters coordinate data of upper left and lower right points (Xa, Ya) and (Xb, Yb), respectively, of an area to be designated, by using keys 78 and * key 83. For example, assume that the operator enters coordinate data of points A' and A" in area A shown in FIG. 9. Then, CPU 90 stores them, i.e., data of points A' and A" as 1st (#1) coordinate data of the first format (M0) in RAM 92.

If the operator wishes to designate another area, he depresses area designating key 75 again. Then, CPU 90 determines next area designation and displays "PHOTO AREA, M0/#2, Xa=, Ya=, Xb=, Yb=" on display 62. In response to this display, the operator enters coordinate data of upper left and lower right points (Xa, Ya) and (Xb, Yb) of the designation area, using keys 78 and 83. For example, assume that the operator enters coordinate data of points B' and B" in area B, shown in FIG. 9. Then, CPU 90 stores them, i.e., data of points B' and B" as 2nd (#2) coordinate data of the first format (M0) in RAM 92.

If the operator wishes to designate still another area, he depresses area designating key 75 again. Then, CPU 90 determines next area designation and displays "PHOTO AREA, M0/#3, Xa=, Ya=, Xb=, Yb=" on display 62. In response to this display, the operator enters coordinate data of upper left and lower right points (Xa, Ya) and (Xb, Yb) of the designation area, using keys 78 and 83. For example, assume that the operator enters coordinate data of points C' and C" in area C shown in FIG. 9. Then, CPU 90 stores them, i.e., data of points C' and C" as 3rd (#3) coordinate data of the first format (M0) in RAM 92.

When the designation areas are to be stored, the operator depresses area storage key 70. CPU 90 displays "AREA DESIGNATION MEMORY STORE AT MEMORY NO.? (.12...567.9)" on display 72. In this case, an empty memory No. at which no format data stored is displayed. In response to this display, the operator may depress, e.g., the * key 83 and "0" key of ten keys 78 and select a format No. to be stored. CPU 90 stores the coordinate data of the respective areas (#1, #2, #3) of format No. (1) in RAM 92.

The above description is made for a case when the photo area mode is designated. However, the same applies in the other modes (character, masking, and trimming area modes).

Data of areas in the other formats (M1 to M9) can be stored in the same manner as for the first format (M0).

Readout operation of the format stored in the above manner will be described. The operator depresses area readout key 71. CPU 90 determines area readout and displays 37 AREA DESIGNATION MEMORY READOUT FROM MEMORY NO.? (0..34...8.)" on display 62. In this case, only a memory No. at which format data is stored is displayed. In response to this display, the operator depresses, e.g., the * key 83 and "0" key of ten keys 78 and selects the readout format. By this selection, CPU 90 reads out the content of the corresponding format (M0) at the first area (#1) from RAM 92 and displays (PHOTO AREA, M0/#1, Xa=20, Ya=20, Xb=90, Yb=90) on display 62. Subsequently, when the operator depresses area designation key 75 for a next area designation, CPU 90 determines the next area designation, reads out the content of the corresponding format (M0) from the second area (#2) of the RAM 92, and displays "PHOTO AREA, M0/#2, Xa=70, Ya=80, Xb=130, Yb=130" on display 62.

When area designation or area readout is completed in the above manner, the operator depresses designation finish key 73. CPU 90 determines data transfer and displays "PHOTO AREA DESIGNATION #1, #2, #3, DATA BEING TRANSFERRED!" on display 62. CPU 90 also transfers area data (#1, #2, #3) for a designated area, e.g., format (M0) to CPU 19 via serial interface 95, cable 61, and communication controller 24. When the data transfer is finished, CPU 90 displays "PHOTO AREA DESIGNATION #1, #2, #3 DOCUMENT READ OK" on display 62.

Figure 9:
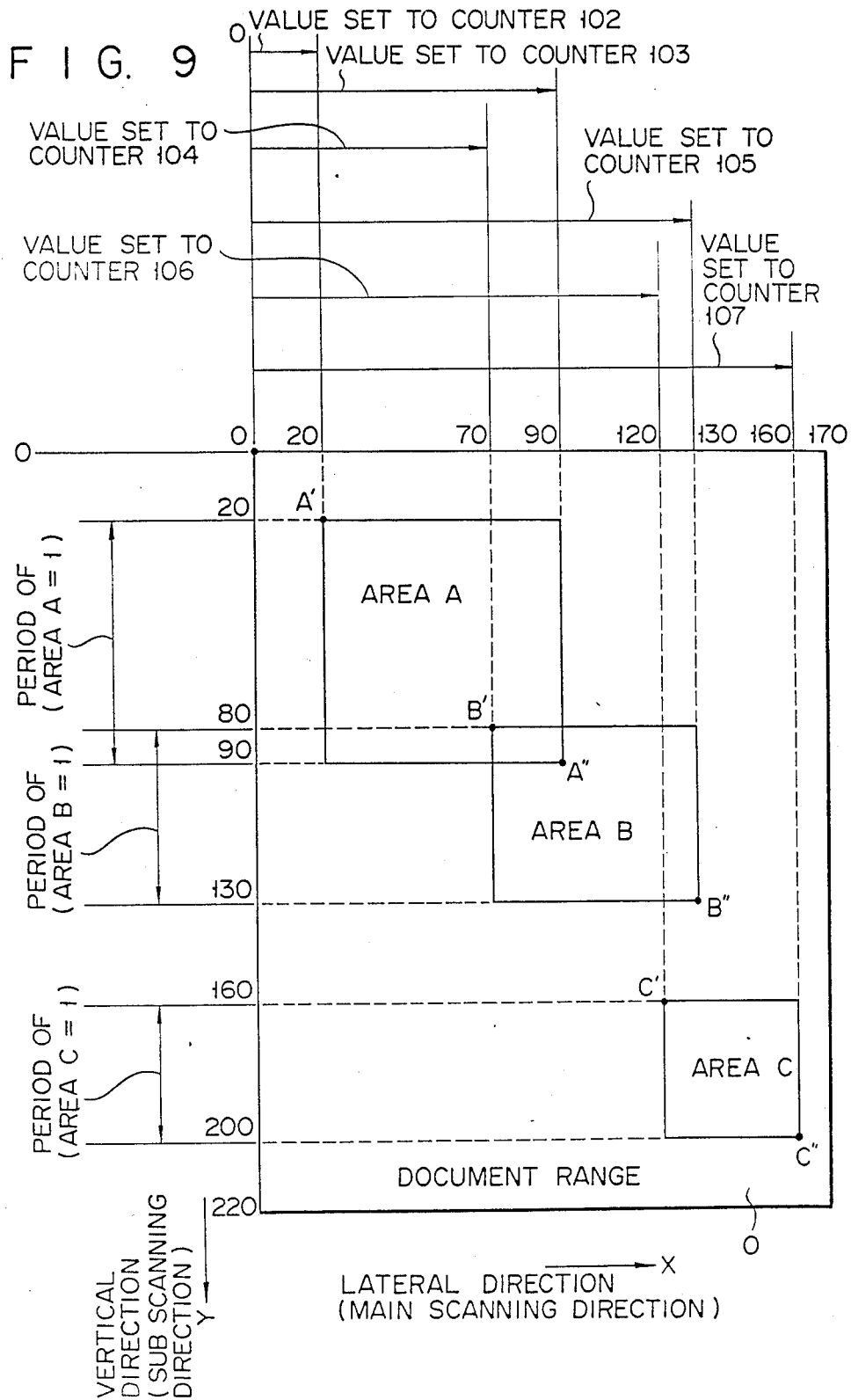

Subsequently, CPU 19 stores the transfer data, i.e., area data (#1, #2, #3) corresponding to format (M0), in the area data storage area of memory 25. In this case, since the area data is photo area data, CPU 19 turns on the central portion of indicator 37 and indicators 38 and 47, and fixes the respective keys of photo and character readout designations so that they are disabled to switch. In this state, selection and switching of the document size and so on are performed, and original O, shown in FIG. 9, is placed on document table 1.

A command signal requesting original read start is supplied from a CPU (not shown) of an external, i.e., image data file unit to CPU 19 via interface 18. CPU 19 controls driver 21 to move the optical system, and controls driver 23 to turn on exposure lamp 2. Thus, lamp 2 emits light onto original O, and reflected light from original O is guided to line image sensor (CCD) 7 via mirrors 3, 4, and 5 and lens 6.

Sensor 7 coverts the image formed by the guided light into a corresponding analog electrical signal, and the signal is supplied to A/D converter 9 via amplifier 8. A/D converter 9 converts the analog signal supplied from sensor 7 via amplifier 8 into a digital signal, and the digital signal is supplied to shading correcting circuit 10. Correcting circuit 10 performs shading correction for the suppleid digital signal, and the corrected signal is supplied to simple and dither binary coders 11 and 12. Coder 11 compares the signal supplied from correcting circuit 10 with a predetermined slice level. When the signal is of a higher level than the slice level, coder 11 determines the signal as "white" and outputs a "0" signal. When the signal is of a level lower than the slice level, coder 11 determines the signal as "white" and outputs a "1" signal. Coder 12 binary-codes the signal supplied from correcting circuit 10 using, e.g., a dither pattern, and outputs a "0" or "1" signal. An output from coder 11 is supplied to switch 15 via switch 13. An output from coder 12 is supplied to switch 15 via swtich 13.

CPU 19 outputs command data to area-designating controller 26 in accordance with the area data read out from the area data storage area of memory 25 and processing timings of sub and main scanning directions of original O by coders 11 and 12. When the document range in the sub scanning direction is "0 to 20", command register 100 outputs a "0" signal only from its output terminal a. Then, when the range in the sub scanning direction is "20 to 80", count values "20" and "90" are set in counters 102 and 103, respectively, and register 100 outputs "0" and "1" signals from its output terminals a and b, respectively.

When the range in the sub scanning direction is "80 to 90", count values "20", "90", "70", and "130" are set in counters 102, 103, 104, and 105, respectively, and register 100 outputs "0" and "1" signals from its output terminals a, and b and c, respectively.

When the range in the sub scanning direction is "90 to 130", count values "70" and "130" are set in counters 104 and 105, respectively, and register 100 outputs "0" and "1" signals from its output terminals a and c, respectively. When the range in the sub scanning direction is "130 to 160", register 100 outputs a "0" signal only from its output terminals a.

When the range in the sub scanning direction is "160 to 200", count values "120" and "160" are set in counters 106 and 107, respectively, and register 100 outputs "0" and "1" signals from its output terminals a and d, respectively. When the range in the sub scanning direction is "200 to 220", register 100 outputs a "0" signal only from its output terminal a.

Therefore, when the range in the sub scanning direction is "0 to 20", "130 to 160", or "200 to 220", EOR circuit 118 outputs a "0" signal as a switching signal. This switches switch 15 to the coder 11 side. As a result, the output from coder 11 is supplied to serial-parallel converter 16 via switches 13 and 15 during this sub scanning, and is output to the image file (not shown) via interface 18.

When the range in the main scanning direction is "20 to 90" while that in the sub scanning direction is "20 to 80", "20 to 130" while "80 to 90", "70 to 130" while "90 to 130", or "120 to 160" while "160 to 200", respectively, EOR circuit 118 outputs a "1" signal as a switching signal. This switches switch 15 to the coder 12 side. As a result, during this period, the output from coder 12 is supplied to converter 16 via switches 14 and 15, and is output to the image file (not shown) via interface 18.

As a result, an image (photo image) within the designation area (area A, B, or C) is scanned in accordance with dither binary code image scanning, an image (character image) outside the designation area is scanned in accordance with simple binary code image scanning, as shown in FIG. 6A, and a resultant image signal is output.

When the transfer data supplied from area designating board 60 to CPU 19 is area data for the character area, the same operation as in a case where the area data of the photo area is supplied, as described above, is performed. In this case, when the same area designation as above is performed, EOR circuit 118 outputs a "1" signal as a switching signal while the range in the sub scanning direction is "0 to 20", "130 to 160", or "200 to 220". This switches switch 15 to the coder 12 side. As a result, during the above period, the output from coder 12 is supplied to converter 16 via switches 14 and 15, and is output to the image file (not shown) via interface 18.

When the range in the main scanning direction is "20 to 90" while that in the sub scanning direction is "20 to 80", "20 to 130" while "80 to 90", "70 to 130" while "90 to 130", or "120 to 160" while "160 to 200", respectively, EOR circuit 118 outputs a "0" signal as a switching signal. This switches switch 15 to the coder 11 side. As a result, during the period of the above sub scanning, the output from coder 11 is supplied to converter 16 via switches 13 and 15, and is output to the image file (not shown) via interface 18.

As a result, an image signal as shown in FIG. 6B is output.

Subsequently, assume that the transfer data supplied from area designating board 60 to CPU 19 is area data for a trimming area. CPU 19 stores the transfer data, i.e., area data (#1, #2, or #3) corresponding to the format (M0) in the area data storage area in memory 25. In this case, since the area data is trimming area data, CPU 19 turns on the central portion of indicator 37, and indicators 38 and 47, on operation panel 27, so that respective keys for photo, character, and scanning designations can be switched. In this state, selection and switching of photo and character modes, document size, and so on are performed, and original O is placed on document table 1. In this case, if the photo mode is set, CPU 19 switches switches 13 and 14 to the white signal generator 17 side and dither binary coder 12 side, respectively. If the character mode is set, CPU 19 switches switches 13 and 14 to the simple binary coder 11 side and white signal generator 17 side, respectively.

Therefore, when area data as described above is supplied in the photo mode, EOR circuit 118 outputs a "1" signal as a switching signal while the range in the sub scanning direction is "0 to 20", "130 to 160", or "100 to 220". This switches switch 15 to the coder 12 side. As a result, during the period of above sub scanning, the output from coder 12 is supplied to converter 16 via switches 14 and 15, and is output to the image file (not shown) via interface 18.

When the range in the main scanning direction is "20 to 90" while that in the sub scanning direction is "20 to 80", "20 to 130" while "80 to 90", "70 to 130" while "90 to 130", or "120 to 160" while "160 to 200", respectively, EOR circuit 118 outputs a "0" signal as a switching signal. This switches switch 15 to the coder 11 side, i.e., the white signal generator 17 side. As a result, during the above period, an output from generator 17 is supplied to converter 16 via switches 13 and 15, and is output to the image file (not shown) via interface 18.

As a result, an image signal as shown in FIG. 6D is output.

When character masking is selected, the same operation as in the photo mode is performed.

When the transfer data supplied from board 60 to CPU 19 is area data for the masking area, the same operation as for the trimming area is performed, and an image signal as shown in FIG. 6C is output.

As described above, an area in a document is designated, and images within the outside the designation area are scanned in accordance with simple or dither binary code image scannings, respectively. Therefore, when character and photo images are present in a single document, both can be correctly scanned. Area designation can be performed a plurality of times, and a plurality of areas can be designated in a partially superposing manner.

As described manner, area designation and scanning mode designation of the original can be performed by area designating board 60 connected to the housing. When board 60 is provided to an existing unit using an interface, an area designating function can be easily added to the existing unit.

Area designation can be performed separately from operation by the operating section of the housing. Thus, since the operating section of the housing or processing does not become complex, area designation can be performed easily, and area designation data can be stored.

Since board 60 is a separate unit, keys other than on-line, designation confirmation, and designation finish keys 69, 72, and 73 can be operated even while the original scanning unit performs scanning, and coordinate data can be entered any time.

Display of the operation section of the housing can be changed in accordance with the area and mode data supplied from board 60, and operation sequence at the operation section can be simplified.

A second embodiment of the present invention will be described. The respective components of the second embodiment are the same as in the first embodiment except for the binary coding method. More specifically, in the first embodiment, binary coding is performed using only a slice level of a predetermined level and a dither pattern. In contrast to this, in the second embodiment, binary coding is performed using a slice level corresponding to a darkness designation signal and a dither pattern, as will be described later.

Simple binary coder 11 compares a signal supplied from shading correcting circuit 10 with a slice level corresponding to a darkness designation signal supplied from CPU 19, i.e., a slice level corresponding to each different darkness, in accordance with the setting by character darkness setting keys 40 and 41 of operator panel 27. When the signal level is higher than the slice level, CPU 19 determines it as "white" and outputs a "0" signal. When the signal level is lower than the slice level, CPU 19 determines it as "black" and outputs a "1" signal.

Dither binary coder 12 binarily codes a signal supplied from correcting circuit 10 to correspond to the darkness designation signal supplied from CPU 19, i.e., by using a different dither pattern for each different darkness, in accordance with setting by photo darkness setting keys 33 and 34 on operator panel 27, and outputs a "0" or "1" signal.

Area designation and storage are performed in the same manner as in the first embodiment. Subsequent scanning is different from the first embodiment in the following points.

First, when the area data is photo area data, CPU 19 turns on the central portions of indicators 35 and 42, respectively, and indicators 38, 44, 47, and 48, on operator panel 27. In this case, the darkness of the photo is switched by keys 33 and 34, the darkness of the character area is switched by character setting/switching keys 40 and 41, and the density of the character cannot be switched. In this state, selection and switching of the document size and so on are performed, darkness selection for the photo and character are performed, and original O, as shown in FIG. 9, is placed on document table 1.

Thereafter, scanning is performed in the same manner as in the first embodiment, and an output signal from correcting circuit 10 is supplied to coders 11 and 12. In this case, coder 11 compares a signal supplied from correcting circuit 10 with a slice level corresponding to the darkness designation signal supplied from CPU 19 in accordance with setting by keys 40 and 41. When the signal level is higher than the slice level, CPU 19 determines it as "white" and outputs a "0" signal. When the signal level is lower than the slice level, CPU 19 determines it as "black" and outputs a "1" signal to switch 15 via switch 13. Coder 12 binarily codes a signal supplied from correcting circuit 10 by using a dither pattern corresponding to the darkness designation signal which is supplied from CPU 19 in accordance with setting by keys 33 and 34, and outputs a "0" or "1" signal to switch 15 via switch 14.

The same operation as in the first embodiment is performed, and an image signal is thus output.

As described above, according to the second embodiment, an area of the original is designated. Images within and outside the designation area are binarily coded with different binary coding means, or are converted into gray level signals with a gray level means. Darkness obtained by the binary coding and gray level means are scanned such that they can be switched by different darkness switching means.

As a result, according to the present invention, in addition to the advantages of the first embodiment, darkness of character and photo portions of a single original can be switched to optimum darkness and can be scanned at optimum darkness.

FIG. 10 schematically shows an image scanner apparatus according to a third embodiment of the present invention. The same reference numerals in FIG. 10 denote the same portions as in FIG. 1, and a detailed description thereof is omitted.

More specifically, shading correction circuit 10 performs shading correction of a digital signal supplied from A/D converter 9, and outputs it to edge enhance circuit 131 and low pass filter 132. Edge enhance circuit 131 emphasizes the edge component of a signal supplied from correcting circuit 10 and outputs it to binary coder 138 to be described later.

Low pass filter 132 passes only a predetermined frequency component of a signal supplied from correcting circuit 10 in order to remove noise which occurs during the scanning of the original sheet. An output from filter 132 is supplied to peak hold circuit (peak hold means) 133. Peak hold circuit 133 holds a peak value of a signal from filter 132 and comprises, e.g., latch 141 and comparator 142. More specifically, comparator 142 compares signal "A" from filter 132 with values "B" latched by latch 141. When the signal from filter 132 is larger than value "B", the gate of latch 141 is enabled to latch the signal from filter 132. Therefore, a peak value is constantly latched (held) by latch 141. An output from peak hold circuit 133 is supplied to multiplier (simple binary threshold level generating means) 134. Multiplier 134 multiplies a signal supplied from peak hold circuit 133 with a multiplier ($K_N$) supplied from density selector 135 and outputs the multiplication result. Selector 135 outputs a multiplier ($K_N$; e.g., $K_N=\frac{1}{2}$ at a standard darkness) corresponding to a darkness signal supplied from CPU 19. An output from multiplier 134 is supplied to selector 136.

For example, when a signal indicated by a solid line in FIG. 11 is output from filter 132, a fixed value is set to latch 141 by CPU 19 during a period of a reset signal. During a scanning period, a value following the peak value of the signal from filter 132 is held by latch 141, as shown by a broken line in FIG. 11. As a result, a value obtained by multiplication ($K_N=\frac{1}{2}$) by multiplier 134, i.e., a value indicated by an alternate long and short dashed line in FIG. 11, is output as a simple binary threshold level.

Dither threshold level generating circuit (gray level threshold level generating means) 137 generates a dither binary threshold level corresponding to the dither pattern in accordance with the darkness setting signal supplied from CPU 19. For example, generating circuit 137 outputs threshold levels of various values in accordance with clocks (CLK) supplied from master timing circuit 20. The dither and simple binary threshold levels from generating circuit 137 and multiplier 134, respectively, are supplied to selector (selecting means) 136. Selector 136 is switched by area designating controller 26 and selectively outputs a dither or simple binary threshold level supplied from generating value 137 or multiplier 134, respectively. An output from selector 136 is supplied to binary coder (binary coding means) 138. Coder 138 performs binary coding by comparing a signal supplied from enhance circuit 131 with a threshold level (simple or dither binary level) supplied from selector 136. An output from coder 138 is supplied to serial-parallel converter 16.

Note that area designating controller 26 controls selector 136 in accordance with a line sync signal (LSYNC) supplied from master timing circuit 20, a clock (CLK), and area data supplied from CPU 19. CPU 19 outputs a darkness designation signal to density selector 135 in accordance with the darkness set by operator panel 27.

The operation of the third embodiment will now be described. Note that the operation as far as shading correction circuit 10 or area designation and storage are the same as in the first or second embodiments.

Shading correction circuit 10 performs shading correction for a digital signal, and outputs it to edge enhance circuit 131 and lwo pass filter 132. Edge enhance circuit 131 emphasizes the edge component of the supplied signal and outputs it to binary coder 138.

Low pass filter 132 passes only a frequency component of a predetermined frequency of the supplied signal in order to remove the noise which occurs during scanning of the document surface, and supplies the noise-removed output to latch 141 and comparator 142 in peak hold circuit 133. Then, comparator 132 compares a signal "A" supplied from filter 132 with a valve "B" latched by latch 141. When the signal from filter 132 is larger than the value "B" (A>B), the gate of latch 141 is enabled, and the signal from filter 132 is latched in line 141. Then, a peak value is constantly latched (held) by latch 141, as shown in FIG. 11, and the peak hold value is supplied to multiplier 134. Multiplier 134 multiplies the signal supplied from latch 141 with a multiplier ($K_N$) supplied from density selector 135, and outputs the multiplication result, i.e., a simple binary threshold level to selector 136.

Selector 136 also receives a dither binary threshold level, corresponding to the dither pattern, supplied from dither binary threshold level generating circuit 137 in accordance with the darkness. Since selector 136 is controlled by designating controller 26, it selectively outputs a threshold level from generating circuit 137 or multiplier 134 to binary coder 138. As a result, coder 138 compares a signal supplied from enhance circuit 131 with the threshold level supplied from selector 136, and outputs the obtained binary signal. For example, binary coder 138 compares the signal supplied from enhance circuit 131 with a threshold level (simple or dither binary threshold level) supplied from selector 136. When the signal level is higher than the threshold level, binary coder 138 determines it as "white" and outputs a "0" signal. When the signal level is lower than the threshold level, binary coder 138 determines it as "black" and outputs a "1" signal.

The binary output from coder 138 is supplied to serial-parallel converter 16 and is output to the image file (not shown) via interface 18.

As described above, binary coding (scanning) of an image signal can be performed in accordance with a simple binary code image scanning with respect to the background without changing the level of the image signal. Also, binary coding (scanning) in accordance with pseudo- (dither) binary coding image scanning can be performed with a correct pseudo-gray scale. Both binary codings in accordance with simple and dither binary coding image scannings can be performed (i.e., pre-processing of binary coding can be performed in common), and the entire apparatus can be constituted by small-sized hardware, resulting in an inexpensive apparatus.

In the above embodiments, a dither means is used as a binary coding means which generates a pseudo-gray level signal. However, another gray scale means which generates darkness of several levels in units of dots can be used instead. Area designation is performed by an area designating board. However, area data can be supplied from an external image switch unit.

The area designation technique of the present invention is exemplified by an apparatus which scans an original image and performs binary coding or dither coding. However, the present invention is not limited to this, and can be applied to another scanning apparatus such as a copying machine.

What is claimed is:

1. An image scanner apparatus with scanning function, said apparatus comprising:
    image scanning means having optical means for scanning an original in a two-dimensional manner, and photoelectric converting means for converting an optical image obtained by said optical means into an electrical signal;
    binary coding means for performing simple binary coding of the electrical signal supplied from said photoelectric converting means, the simple binary coding not accompanying pseudo-gray scale coding, and for performing pseudo-gray scale binary coding of the electrical signal output supplied from said photoelectric converting means, the pseudo-gray scale binary coding accompanying pseudo-gray scale coding;
    area designating means for designating an area on the original;
    scanning mode designating means, which designates image scanning modes corresponding to areas within and outside an area designated by said area designating means, and which has at least a first scanning mode designating section which does not accompany pseudo-gray scale coding and a second scanning mode designating section which accompanies pseudo-gray scale coding; and
    controlling means for controlling an output or outputs from said binary coding means in accordance with designation by said area and mode designating means;
    said area designating means being capable of designating a plurality of areas and at least two of said plurality of areas being capable of being designated in a partially overlapping manner.

2. An apparatus according to claim 1, wherein said area designating means includes means for inputting coordinate data of an area to be designated.

3. An apparatus according to claim 1, wherein said binary coding means further includes second threshold level generating means for generating a second threshold level which accompanies pseudo-gray scale coding, and second binary coding means for comparing the electrical signal with the second threshold level supplied from said second threshold level generating means in order to perform pseudo-gray scale binary coding.

4. An apparatus according to claim 1, wherein said apparatus further comprises at least one darkness designating means for designating a scanning darkness of the original in accordance with the darkness of the original, and darkness switching means for switching a binary coding level of said binary coding means.

5. An apparatus according to claim 1, wherein said binary coding means includes peak hold means for holding a peak value of the electrical signal, first threshold level generating means for multiplying the peak hold value of said peak hold means by a predetermined constant in order to generate a first threshold level which does not accompany pseudo-gray scale coding, and first binary coding means for comparing the electrical signal with the first threshold level supplied from said first threshold level generating means in order to perform simple binary coding.

6. An apparatus according to claim 5, wherein said binary coding means further includes a low pass filter for supplying the electrical signal having only a predetermined frequency component to said peak hold means.

7. An apparatus according to claim 1, wherein said first and second scanning mode designating sections are character and photo mode designating means for separately designating character and photo areas present on the original, respectively.

8. An apparatus according to claim 7, wherein said scanning mode designating means further has a masking area mode designating section for designating scanning outside an area designated by said area designating means, and said controlling means erases the output within an area in accordance with designation by said masking area mode designating section.

9. An apparatus according to claim 7, wherein said scanning mode designating means further has a trimming area mode designating section for designating scanning within only an area designated by said area designating means, and said controlling means erases the output outside an area in accordance with designation by said trimming area mode designating section.

10. An apparatus according to claim 7, wherein said character mode, photo mode, and area designating means are provided on area designating board means separate from said apparatus.

11. An apparatus according to claim 10, wherein said area designating board further has non-volatile memory means for storing designation data of said character mode, photo mode, and area designating means, and means for transferring data stored in said memory to said controlling means in said apparatus.

12. An image sensor apparatus with scanning function, said apparatus comprising:
image scanning means having optical means for scanning an original in a two-dimensional manner, and photoelectric converting means for converting an optical image obtained by said optical means into an electrical signal;
previous processing means including a shading correction circuit and an edge enhance circuit for the electrical signal supplied from said photoelectric converting means, and a converting circuit for converting the electrical signal supplied from said photoelectric converting means into multi-level data;
binary coding means for performing simple binary coding of the multi-level data supplied from said converting circuit, the simple binary coding not accompanying pseudo-gray scale coding, and for performing pseudo-gray scale binary coding of the multilevel data supplied from said converting circuit, the pseudo-gray scale binary coding accompanying pseudo-gray scale coding;
area designating means for designating an area on the original;
scanning mode designating means, which designates image scanning modes corresponding to areas within and outside an area designated by said area designating means, and which has at least a first scanning mode designating section which does not accompany pseudo-gray scale coding and a second scanning mode designating section which accompanies pseudo-gray scale coding; and
controlling means for controlling an output or outputs from said binary coding means in accordance with designation by said area and mode designating means.

13. An image processing apparatus comprising:
means for scanning image information from an original image;
designating means, which is separated from said scanning means, for designating an area on the original image and at least one of a plurality of image processing modes for inputting the image information corresponding to the designated area, said designating means having memory means for storing data of the designated area and data of the designated image processing mode and transfer means for transferring the data stored in said memory means to said scanning means; and
means for processing the image information scanned by said scanning means in accordance with the designated area and the designated image processing mode.

14. An apparatus for processing image information of an original image, said apparatus comprising:
first designating means for designating a plurality of areas in a partially overlapping manner on the original image;
second designating means for designating at least one of a plurality of image processing modes for inputting the image information corresponding to areas designated by said first designating means; and
means for processing the image information in accordance with designation by said first and second designation means.

* * * * *